United States Patent [19]

Sims et al.

[11] Patent Number: 4,905,203

[45] Date of Patent: Feb. 27, 1990

[54] DOWNHOLE DOPPLER FLOWMETER

[75] Inventors: Jackie C. Sims; Irwin R. Supernaw, both of Houston, Tex.

[73] Assignee: Texaco Inc., White Plains, N.Y.

[21] Appl. No.: 251,286

[22] Filed: Sep. 30, 1988

[51] Int. Cl.⁴ .............................................. G01V 1/40
[52] U.S. Cl. ....................................... 367/25; 367/90;
175/48; 73/155; 73/861.25
[58] Field of Search ....................... 367/25, 32, 33, 90;
181/105; 175/48; 73/861.25, 155

[56] References Cited

U.S. PATENT DOCUMENTS

| | | | |
|---|---|---|---|
| 3,498,290 | 3/1970 | Shaw et al. | 73/861.25 |
| 4,532,812 | 8/1985 | Birchak | 73/861.27 |
| 4,545,244 | 10/1985 | Yasuda et al. | 73/861.25 |
| 4,558,219 | 12/1985 | LeBlanc et al. | 250/260 |
| 4,754,641 | 7/1988 | Orbans et al. | 73/155 |

OTHER PUBLICATIONS

Waller, J. M., "Guidelines for Applying Doppler Acoustic Flowmeters," InTech, Oct. 1980, pp. 55-57.

Primary Examiner—Stephen C. Buczinski
Assistant Examiner—Ian J. Lobo
Attorney, Agent, or Firm—Robert A. Kulason; James J. O'Loughlin; Ronald G. Gillespie

[57] ABSTRACT

A well logging system which monitors the flow rate of a fluid flowing in a borehole traversing an earth formation includes a sonde. A transmitter located in the sonde transmits acoustical waves into the fluid at a predetermined frequency. A receiver also located in the sonde receives reflected acoustical waves. The receiver also provides a signal corresponding to the received reflected acoustical waves. The provided signal is processed for being sent uphole by way of a cable. Electronics at the surface include circuitry which derives the velocity of the fluid in accordance with the frequency of the processed signal and the predetermined frequency. The circuitry provides an output signal corresponding to the derived velocity of the fluid flowing the borehole.

8 Claims, 1 Drawing Sheet

DOWNHOLE DOPPLER FLOWMETER

BACKGROUND OF THE INVENTION

1. Field of the Invention

The present invention relates to well logging systems and methods in general and, more particularly, to well logging systems and methods which measure the flow rate of a fluid flowing in a borehole.

SUMMARY OF THE INVENTION

A well logging system which monitors the flow rate of a fluid flowing in a borehole traversing an earth formation includes a sonde. A transmitter located in the sonde transmits acoustical waves into the fluid at a predetermined frequency. A receiver also located in the sonde receives reflected acoustical waves. The receiver also provides a signal corresponding to the received reflected acoustical waves. The provided signal is processed for being sent uphole by way of a cable. Electronics at the surface include circuitry which derives the velocity of the fluid in accordance with the frequency of the processed signal and the predetermined frequency. The circuitry provides an output signal corresponding to the derived velocity of the fluid flowing in the borehole.

The objects and advantages of the present invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
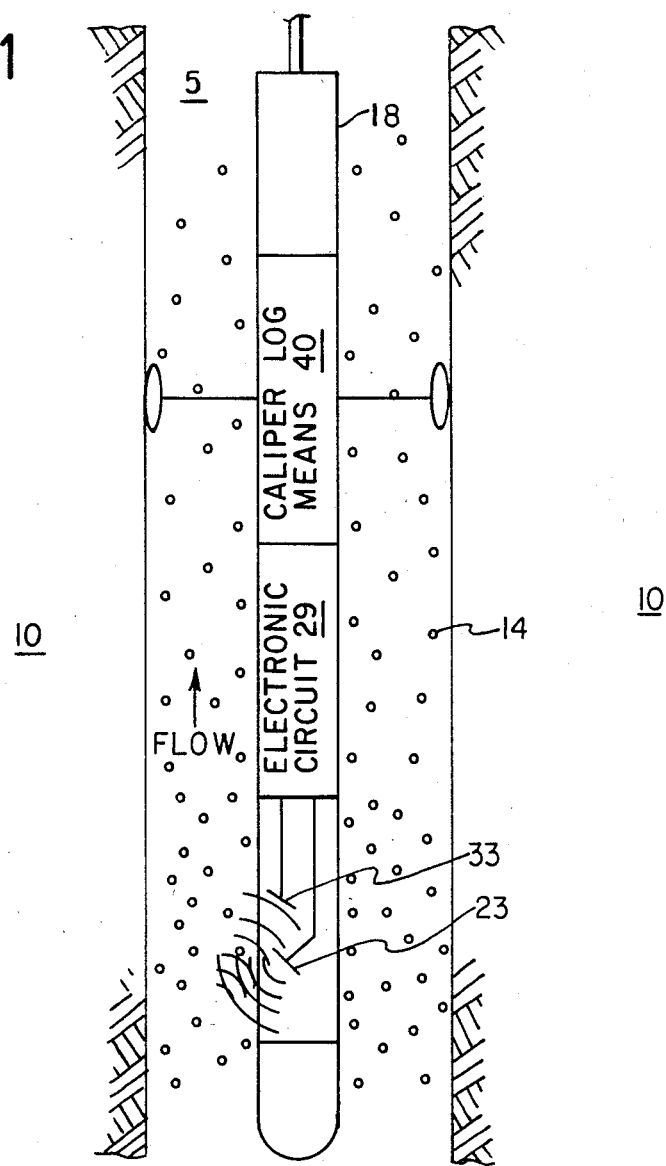
FIG. 1 is a graphical representation of a well logging sonde in a borehole emitting acoustical waves into the fluid flowing in the borehole and receiving the acoustical waves in accordance with the present invention.

One of the primary applications of production logging is to determine the oil and water flow rates at various depths in a well. These rates are calculated from the measurements of water holdup and total flow. The accuracy of the results are greatly influenced by both the total flow and water holdup measurements.

In production logging, flow measurements are made almost entirely by spinners or impellers. The total flow rate of the fluid is related to the speed of the spinner which is measured by electrically counting the revolutions per second of the impeller. Even though spinners have been widely used for many years and have been greatly improved, they still have many disadvantages and restrictions.

Some of the disadvantages of a spinner flowmeter relate to mechanical effects and others relate to the properties of the fluid and the flow which is being measured. For example, the impeller of the spinner operates on a bearing which wears and requires frequent inspection and replacement to keep frictional effects from influencing the measurements. Another disadvantage, which increases logging time on the well, is that calibration must be done downhole by making several extra logging runs at various logging speeds. In reference to the fluid properties, the spinner speed is not only affected by changes in the velocity of the fluid but also by changes in the viscosity and temperature of the fluid.

One of the major restrictions on spinner flowmeters is that the minimum measurable flow is not low enough to measure all the flow rates of interest in many wells. The industry has taken two approaches to overcome this limitation. One approach uses spinners with longer blades or impellers to expose more surface area to the flow. These spinners, called fullbore spinners or flowmeters, do operate at lower flow rates but still suffer from the problems discussed previously. In fact, they may suffer even more since a greater surface area is exposed to the fluid and the flow. An additional mechanical problem is involved because the longer blades of this spinner must be designed and operated to collapse into the standard 1 11/16 inch tool diameter. This constraint is required so the tool can be lowered and raised through the production tubing in the well.

The second approach that has been taken to overcome the minimum flow limitation of the spinner is to divert all the flow in the casing or borehole through the center of the tool where the spinner is located. Since the diameter of the flow is greatly reduced, its velocity will increase to a level where the spinner is operational. The flow is diverted through the center of the tool by using either an inflatable packer (packer flowmeter) or an expandable basket (basket flowmeter).

Both of these diverting flowmeters also suffer from additional mechanical problems. They must not only expand to produce a seal between the tool and the casing or borehole, but they also must collapse into the 1 11/16 inch tool diameter for passage through the production tubing. Since there is no way to ensure a good seal, leakage around the tool is always possible and could cause significant errors in the measured flow.

Calibration of the diverting flowmeters is also questionable. Since a seal is required between the tool and the borehole, only stationary measurements can be made. Thus the logging engineer cannot perform the normal downhole calibration by running at different logging speeds. One must calibrate these tools in a flow loop at a test facility, and assume that they remain constant during logging. Initially, such a calibration is probably sufficient, but as the bearing of the spinner wears and as different fluids mixtures and properties are encountered, the calibration may become inaccurate.

One final limitation of the fullbore flowmeter and the diverting flowmeters is that they were designed for low flow rates and cannot be operated in some of the higher flows. In many wells, one will be interested in measuring both the low flow rates in the lower zones and the higher rates that develop in the upper portion of the well. Thus in addition to a low flow rate device, a regular spinner must also be run. Since one is normally interested in obtaining other borehole data, the production tool string is usually already configured to its maximum length. Therefore, to run both a regular spinner and a low flow rate meter, an extra trip into the hole is generally required which increases the logging cost and the time on the well.

The present invention obviates many of the problems associated with spinners and provides a new and improved flow measurement for production logging and injection profiling. The present invention's operation is based upon the doppler principle which states that the change in frequency of a soundwave as it is reflected off of a moving particle is proportional to the velocity of the particle. If the motion of the particle is the same as that of the flowing fluid, then the frequency change or shift is also proportional to the velocity of the fluid.

Figure 2:
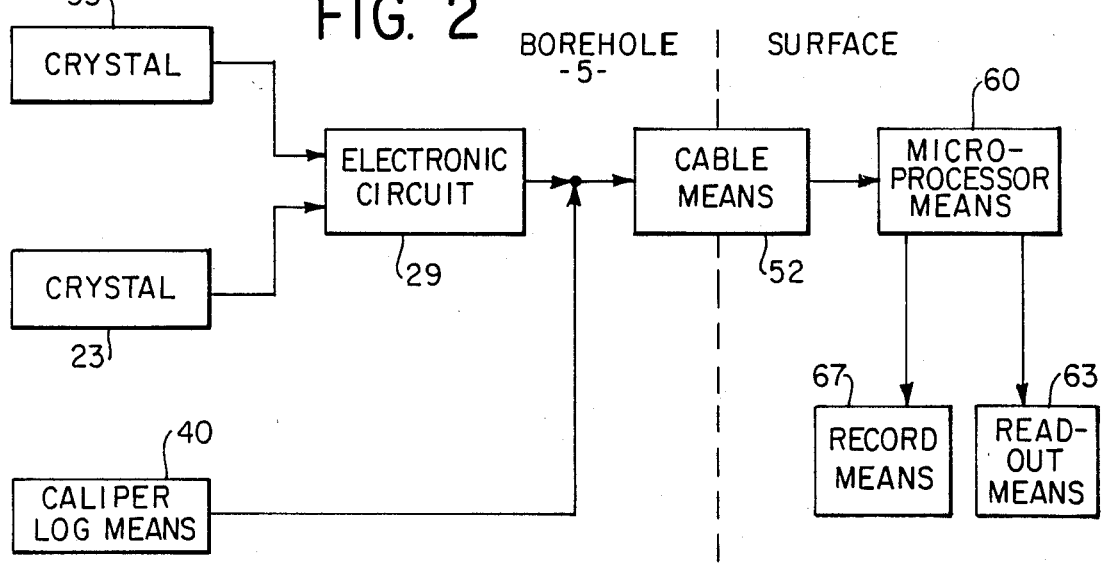
FIG. 2 is a simplified block diagram of a fluid flow rate monitor constructed in accordance with the present invention.

Referring to FIGS. 1 and 2, there is shown a borehole 5 traversing an earth formation 10 having water flowing upward containing particles 14.

A conventional well logging sonde 18 contains a transmitting crystal 23. Electronic circuit 29 provides electrical energy to transmitter crystal 23 causing it to provide acoustical waves at a known frequency into the fluid flow. The waves are reflected off particles 14 and the reflected waves are received by receiver crystal 33. Crystal 33 provides an electrical energy back to electronic circuit 29 at a frequency that is altered by the fluid flow. The difference between the transmitted frequency from the transmitting crystal 23 and the reflected frequency from the receiver crystal 33 is proportional to the velocity of the flow.

The electronic circuit 29, processes the signals, determines the frequency difference and provides a signal which is proportional to the velocity of the reflecting surface. Electronic circuit 29 may be a conventional signal processor used in Doppler flowmeters such as the Polysonics Hydra Flowmeter Model DHT.

A conventional caliper log means 40 has pads 42, 43 urged against the wall of borehole 5, by arms 47 and 48, respectively, so as to centralize sonde 18 in borehole 5. Caliper log means 40 also provides a signal representative of the diameter of borehole 5 in accordance with positioning of pads 42, 43.

The signal from the electronic circuit 29 is transmitted to the surface through the wireline cable means 52 and can be calibrated to indicate fluid velocity. The calibration can be accomplished prior to logging in a flow loop or during logging by running at several different cable speeds. Similarly, caliper log means 40 provides its signal to the surface via cable means 52.

Cable means 52 provides both signals to microprocessor means 60 where the velocity V in feet per minute is determined from V=sk, where s is the signal provided by electronic circuit 29 and k is a calibration factor derived during calibration. The calibrated fluid velocity will be exact if the tool is run stationary. If the tool is moving upwards, the actual fluid velocity will be the indicated velocity minus the velocity of the cable. Microprocessor means 60 derives the flow rate FR, in barrels per day, of the fluid flowing borehole 5 from $$FR = 1.4 \, V \, (D^2 - d^2) \text{ where}$$

D is the diameter of borehole 5 and d is the diameter of tool 18.

Microprocessor means 60 provides signals to read-out means 63 and to record means 67. Read-out means 63 provides a digital display and if desired a print-out. Record means 67 provides a recorded tape of the flow rate measurements.

What is claimed is:

1. A well logging system for monitoring the flow rate of a fluid flowing in a borehole traversing an earth formation comprising:

a sonde including therein:
   transmitter means for transmitting acoustical waves into the fluid at a predetermined frequency,
   receiver means for receiving reflected acoustical waves and providing a received signal corresponding thereto,
   caliper means for sensing the diameter of the borehole and providing a diameter signal D corresponding thereto, and
   means for processing the received signal to provide a frequency signal, corresponding to a relationship between the frequency of the transmitted acoustical waves and the frequency of the reflected waves in accordance with the received signal;
   cable means connected to the processing means and to the caliper means for carrying the frequency signal and the diameter signal D to the surface; and
   surface electronics including:
   means connected to the cable means for deriving the flow rate FR of the fluid in accordance with the frequency signal and the diameter signal and providing an output signal corresponding thereto.

2. A system as described in claim 1 in which the frequency signal provided by the processing means is related to the frequency difference between the transmitted acoustical waves and the received signal.

3. A system as described in claim 2 in which the deriving means determines the velocity V of the flowing fluid in accordance with the received signal and the following equation:

$$V = sk$$

where s is the received signal and k is a calibration constant.

4. A system as described in claim 3 in which the deriving means derives the flow rate FR in accordance with the diameter signal D and the determined velocity V and the following equation:

$$FR = 1.4V(D^2 - d^2)$$

where d is the known diameter of the sonde.

5. A well logging method for monitoring the flow rate of a fluid flowing in a borehole traversing an earth formation comprising the steps of:

transmitting acoustical waves into the fluid from a sonde at a predetermined frequency,
   receiving reflected acoustical waves in the sonde,
   providing a received signal corresponding to the received acoustical waves,
   sensing the diameter of the borehole,
   providing a diameter signal D corresponding to the sensed diameter,
   processing the received signal to provide a frequency signal, corresponding to a relationship between the frequency of the transmitted acoustical waves and the frequency of the reflected waves in accordance with the received signal,
   carrying the frequency signal and the diameter signal D to the surface by way of a cable, and
   deriving the flow rate FR of the fluid at the surface in accordance with the frequency signal and the diameter signal, providing an output signal corresponding to the derived flow rate FR.

6. A method as described in claim 5 in which the processing step includes:

providing the frequency signal in accordance with the frequency difference between the transmitted acoustical waves and the received signal.

7. A method as described in claim 6 in which the deriving step includes:
   determining the velocity V of the flowing fluid with determining means in accordance with the received signal and the following equation:

$V = sk$ where s is the received signal and k is a calibration constant.

8. A method as described in claim 7 in which the deriving step includes:
   deriving the flow rate FR with deriving means in accordance with the diameter signal D and the determined velocity V and the following equation:

$FR = 1.4V(D^2 - d^2)$ where d is the known diameter of the sonde.

* * * * *